United States Patent [19]

Kassai

[11] Patent Number: 4,543,685
[45] Date of Patent: Oct. 1, 1985

[54] CASTER

[75] Inventor: Kenzou Kassai, Osaka, Japan

[73] Assignee: Kassai Kabushikikaisha, Osaka, Japan

[21] Appl. No.: 630,219

[22] Filed: Jul. 12, 1984

[30] Foreign Application Priority Data

Jul. 22, 1983 [JP] Japan .............................. 58-134951

[51] Int. Cl.⁴ ............................................ B60B 33/02
[52] U.S. Cl. ........................................ 16/35 R; 16/44
[58] Field of Search ...................... 16/35 R, 35 D, 44;
188/20, 69; 280/43, 43.17, 43.18, 43.19, 87.01,
87.02 W, 47.12, 204, 205

[56] References Cited

U.S. PATENT DOCUMENTS

| | | | |
|---|---|---|---|
| 1,633,638 | 6/1927 | Jarvis et al. | 16/35 R |
| 2,458,922 | 1/1949 | Andersen | 16/44 |
| 4,028,773 | 6/1977 | Morgan | 16/35 R |
| 4,336,629 | 6/1982 | Jarvis, Jr. et al. | 16/35 R |
| 4,349,938 | 9/1982 | Fontana | 16/35 R |

Primary Examiner—Donald R. Schran
Assistant Examiner—James Wolfe
Attorney, Agent, or Firm—W. G. Fasse; D. H. Kane, Jr.

[57] ABSTRACT

A cast with an inherent function of automatically changing the direction of a wheel (11) is selectively stopped. A severe shock applied to the wheel (11) cancels the lock on the wheel (11) against the change of direction. In response to such shock, a wheel attaching member (12) is turned around the axis of a pivot shaft (13), whereby a key member (20) held by the wheel attaching member (12) escapes from a fitting recess (29a or 29b) formed in a fixed bushing (27). As a result, the rotary bracket (4) is allowed to rotate around the vertical shaft (5).

6 Claims, 7 Drawing Figures

CASTER

BACKGROUND OF THE INVENTION

This invention relates to a caster and more particularly it relates to a caster whose inherent function of automatically changing the direction of the wheel can be selectively stopped.

Casters of this type are advantageous particularly when attached to a baby carriage, for example. That is, if such casters are attached to the lower ends of leg members, e.g., front legs, of a baby carriage, the baby carriage can be smoothly moved even if the pushing force thereon is weak. Further, it can be easily changed in the direction of travel even in narrow aisles as in stores. On the other hand, on a gravel road, for example, if the casters are in the state of being capable of changing the direction of the wheels on the basis of their inherent function, the casters allow the wheels to fluctuate more than is necessary; thus, the inherent function of the casters does more harm than good, making it rather hard to push the baby carriage. Thus, an improved caster is constructed so that its inherent function can be stopped, as needed.

Such improved caster is advantageous in that it ensures satisfactory steerability at all times depending upon the condition of the road.

A point to be desired in the aforesaid type of caster is as follows.

For example, when the baby carriage is being moved with the inherent caster function stopped and with the direction of the wheels fixed, if the wheels come across a relatively large difference in level, sometimes a great shock is transmitted from the wheel to the operative portions of the caster. In such case, the caster could be fatally damaged. In this case, if the wheel is allowed to change the direction, the aforesaid situation of the wheel coming across a difference in level results in the wheel changing the direction, whereby the shock can be successfully absorbed, being prevented from leading to damage to the caster. Thus, it is desired that when such shock is applied to the wheel, the state in which the inherent function of the caster is stopped is immediately cancelled.

SUMMARY OF THE INVENTION

Accordingly, an object of this invention is to provide a caster the inherent function of which can be selectively stopped, said caster being characterized in that a shock to the wheel is utilized to cancel the lock on the wheel against the change of direction.

This invention starts with a caster comprising a fixed bracket secured to an object to be moved by said caster, a rotary bracket supported for rotation around a fixedly installed vertical shaft vertically extending from said fixed bracket, and a wheel rotatably supported with respect to said rotary bracket on an axle horizontally directed at a position horizontally deviated from the axis of said vertical shaft. According to such a caster the invention is characterized by the following arrangement.

A wheel attaching member for supporting the axle of said wheel is turnably attached to said rotary bracket by a horizontally directed pivot shaft positioned between said vertical shaft and said wheel. The rotary bracket is formed with a stopper which, when said wheel attaching member is turned around the axis of said pivot shaft, defines the terminal end of the upward movement of said wheel. A key member movable toward said vertical shaft is installed in said wheel attaching member at a position above said pivot shaft. At least one fitting recess is disposed on the outer surface of said vertical shaft. Said key member first into the recess as it is moved with at least one predetermined angle obtained by the rotation of said rotary bracket around said vertical shaft.

When the key member fits in the fitting recess in this manner, the rotation of said rotary bracket around the vertical shaft is inhibited and, moreover, in this inhibited state, when a force greater than a predetermined value is applied to said wheel attaching member in a direction to move said wheel downwardly, said wheel attaching member is turned in said direction, with the key member escaping from said fitting recess, thereby allowing the rotation of said rotary bracket around said vertical shaft. That is, when a shock applied to the wheel exceeds a predetermined level, it serves as a force to turn the wheel attaching member, whereby the key member escapes from the fitting recess. As a result, the lock on the wheel against the change of direction is cancelled.

According to this invention, when a severe shock is applied to the wheel, the lock on the wheel against the change of direction can be instantly cancelled. Therefore, such severe shock can be absorbed by the wheel changing its direction and hence fatal damage to the caster can be advantageously avoided.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
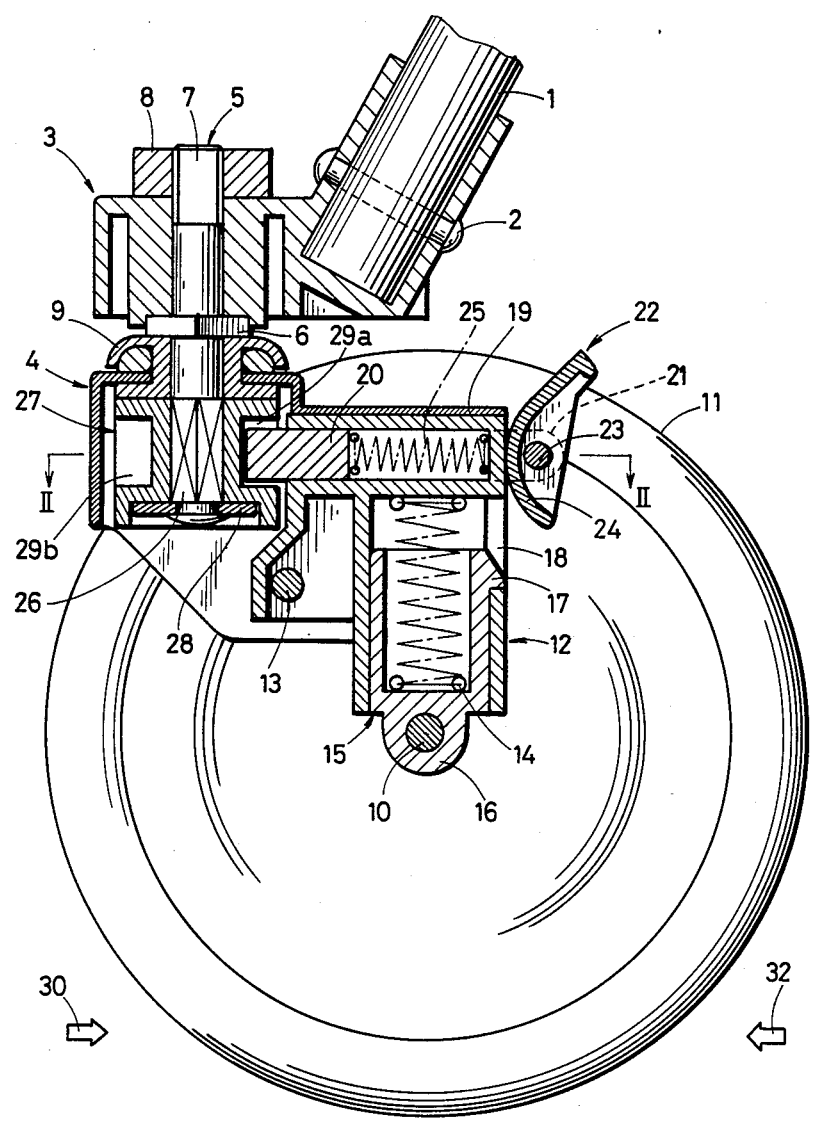
FIG. 1 is a partly sectioned view of the lower end portion of a front leg of a baby carriage, showing a state in which the wheel of a caster according to an embodiment of this invention is locked against the change of direction.
Figure 4:
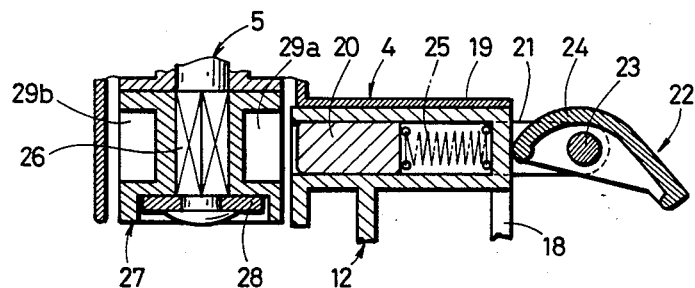
FIG. 4 is a sectional view of a key member shown in FIG. 1 and the related arrangement, showing the unlocked state.
Figure 3:
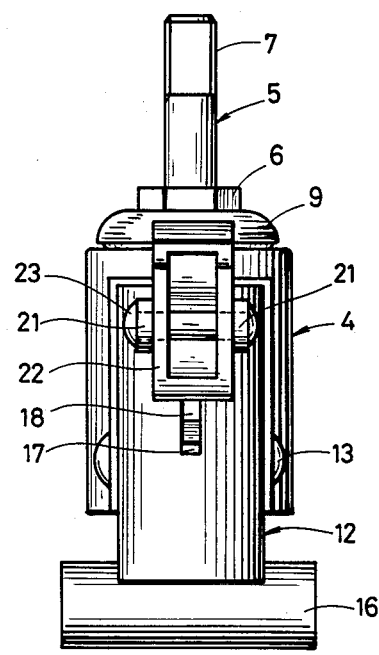
FIG. 3 is a view taken from the right-hand side of FIG. 1, with the wheel omitted from the illustration.
Figure 5:
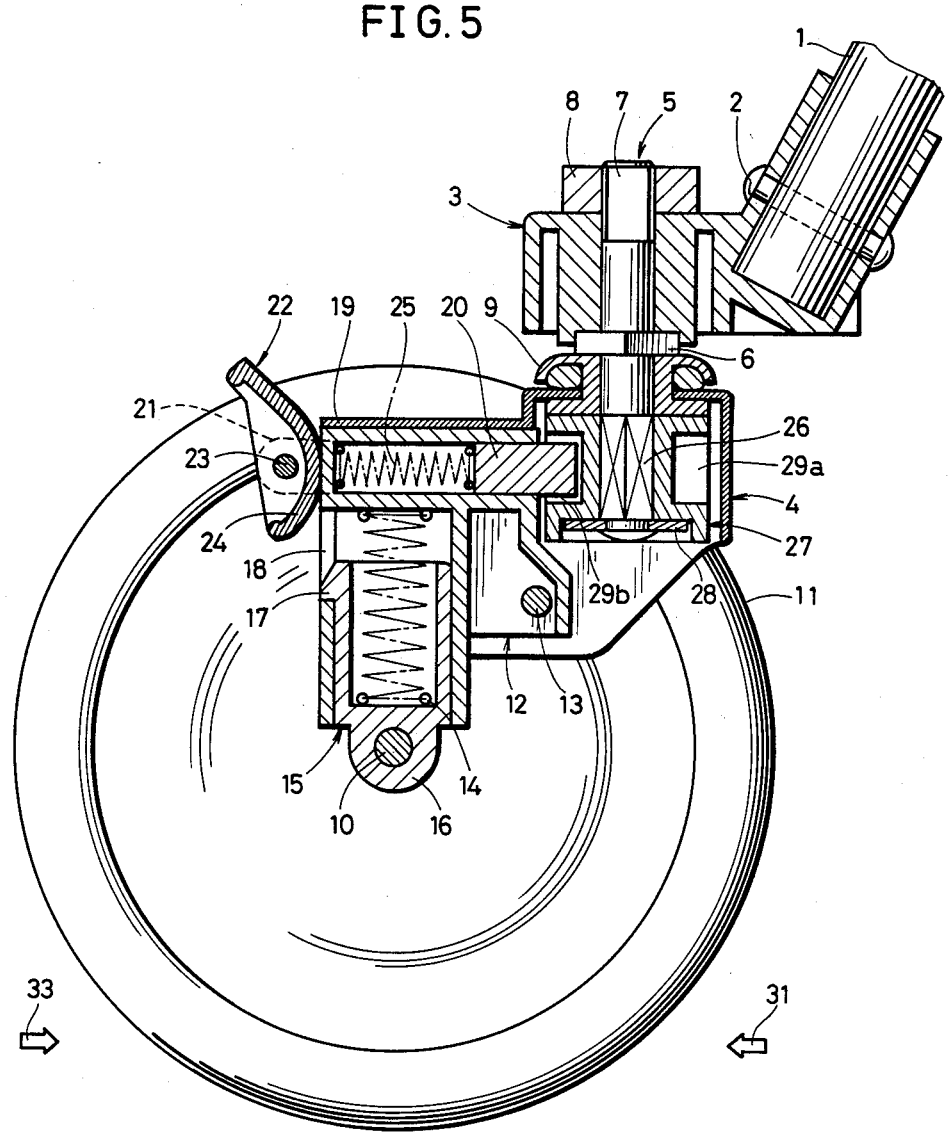
FIG. 5 shows a portion corresponding to the one shown in FIG. 1 and also shows a state in which the direction of the wheel is changed through 180 degrees as compared with the case of FIG. 1 and in which the wheel is locked against the change of direction.

FIGS. 1 to 6 show an embodiment of this invention wherein a caster is attached to a front leg of a baby carriage, with the lower end portion of a front leg 1 of a baby carriage being shown in FIGS. 1 and 5.

For example, referring to FIG. 1, the lower end portion of the front leg 1 has a fixed bracket 3 secured thereto by a pin 2. A rotary bracket 4 is disposed below the fixed bracket 3. The rotary bracket 4 is supported with respect to the fixed bracket 3 for rotation around a vertically extending axis. More particularly, a vertical shaft 5 extends vertically downwardly from the fixed bracket 3. A lengthwise intermediate portion of the vertical shaft 5 is formed with a hexagonal flange 6 which fits in a recess of corresponding shape formed in the lower surface of the fixed bracket 3, and in this condition a nut 8 is tightened on a thread 7 formed on the upper end of the vertical shaft 5, whereby the vertical shaft 5 is fixed in position with respect to the fixed bracket 5. Disposed below the hexagonal flange 6 is a thrust bearing 9 which supports the rotary bracket 4 for rotation around the vertical shaft 5.

A wheel 11 is rotatably supported with respect to the rotary bracket 4 on an axle 10 horizontal spaced horizontally from the axis of the vertical shaft 5. The details for supporting the axle 10 of the wheel 11 include the rotary bracket 4 having a wheel attaching member 12 turnably attached thereto by a horizontally extending pivot shaft 13 positioned between the vertical shaft 5 and the wheel 11. The wheel attaching member 12 is provided with an axle support 15 vertically movable and urged by a cushion spring 14 to move downwardly. The axle support 15 is formed with a boss 16 in which the axle 10 is received. The axle support 15 is provided with a laterally extending projection 17 received in a vertically extending elongated opening 18 formed in the wheel attaching member 12. This arrangement, while making the axle support 15 vertically movable, defines the terminal end of the downward movement under the action of the cushion spring 14. In this way, the wheel 11 is subjected to a cushioning action. In addition, in this embodiment two wheels 11 are provided for each axle 10 and positioned in parallel on both sides of the rotary bracket 4 and wheel attaching member 12.

The upper end wall of the rotary bracket 4 forms a stopper 19 which, when the wheel attaching bracket 12 is turned around the axis of the support pivot 13, defines the terminal end of the upward turning movement of the wheel 11.

Figure 2:
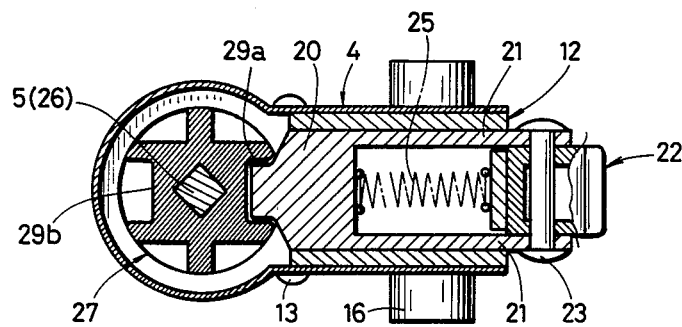
FIG. 2 is a sectional view taken along the line II-II of FIG. 1.

Installed in the wheel attaching member 12 is a key member 20 movable toward the vertical shaft 5 and disposed above the pivot shaft 13. As best shown in FIG. 2 which is a section taken along the line II-II of FIG. 1, the key member 20 is provided with a connecting portion 21 projecting beyond the outer surface of the wheel attaching member 12. The connecting portion 21 has an operating lever 22 turnably connected thereto by a pin 23 which is parallel with the pivot shaft 13. The operating lever 22 is formed with a cam portion 24 defined by large and small diameter portions whose radial dimensions with the center at the pin 23 are relatively long and short, respectively. Further, installed in a space surrounded by the connecting portion 21 of the key member 20 is a spring 25 in the form of a compression spring whose ends are contacted with the key member 20 and with a portion of the wheel attaching member 12 to thereby urge the key member 20 toward the left as viewed in FIG. 1. In this arrangement, turning the operating lever 22 causes the cam portion 24 to move the key member 20 while contacting the outer surface of the wheel attaching member 12.

The lower end of the vertical shaft 5, as best shown in FIG. 2, is formed with a quadrangular-sectioned portion 26. A fixed bushing 27 is secured to portion 26 so that rotation of the bushing 27 around portion 26 is inhibited. The fixed bushing 27 is kept from slipping off the vertical shaft 5 by crimping the lower end of the vertical shaft 5 after a washer 28 has been fitted on the lower end of the vertical shaft 5. The fixed bushing 27, as shown in FIG. 2, has a circular outermost periphery. The fixed bushing 27 is formed with at least one fitting recess 29a, 29b into which the key member 20 fits as it is moved with at least one predetermined angle obtained by the rotation of the rotary bracket 4 around the vertical shaft 5. In this embodiment, two fitting recesses 29a and 29b are formed, spaced 180 degrees apart from each other around the axis of the vertical shaft 5.

On the basis of the arrangement described thus far, the use and operation of the illustrated caster will now be described.

First, in FIGS. 1 to 4, except FIG. 4, a state in which the wheel 11 is locked against the change of direction is shown, and in FIG. 4, the unlocked state is shown.

In the locked state, the operating lever 22 is in a relatively raised position with the small diameter portion of the cam portion 24 positioned on the outer surface of the wheel attaching member 12. Therefore, the pin 23 is at a position nearer to the outer surface of the wheel attaching member 12 with the key member 20 moved into one fitting recess 29a of the fixed bushing 27 by the action of the spring 25. Therefore, the rotation of the rotary bracket 4 round the axis of the vertical shaft 5 is inhibited, making the wheel 11 unable to change its direction.

In the unlocked state shown in FIG. 4, the operating lever 22 has been turned clockwise from the aforesaid state into a relatively lower position, with the large diameter portion of the cam portion 24 positioned on the outer surface of the wheel attaching member 12. At this time, the pin 23 is in a position relatively remote from the outer surface of the wheel attaching member 12, with the key member 20 kept from fitting in the fitting recess 29a against the resilience of the spring 25. Thus, the rotation of the rotary bracket 4 around the axis of the vertical shaft 5 is allowed, making it possible for the wheel 11 to change its direction. This is the state in which the inherent caster function is active.

Means (not shown) for defining the terminal ends of turning of the operating lever 22 may be provided, as needed.

In addition, in this embodiment, the two fitting recesses 29a and 29b are formed on opposite sides of the vertical shaft 5, spaced 180 degrees apart. As a result, there is another state in which the wheel 11 is locked against the change of direction. This state is shown in FIG. 5. In FIG. 5, the key 20 is fitted in the other fitting recess 29b, establishing the locked state. Referring to the positional relation between the wheel 11 and the vertical shaft 5, the wheel 11 is on the right-hand side of the vertical shaft 5 in FIG. 1 and is on the left-hand side of the vertical shaft 5 in FIG. 5.

In this embodiment, the object to which the caster is to be attached is a baby carriage. In such baby carriage, the required direction of travel is usually the direction in which a person pushing the baby carriage is walking. For this reason, it is desirable that when the wheel 11 is locked against the change of direction, the wheel 11 be pointing in this direction of travel. Therefore, in this embodiment, it is so arranged that the wheel 11 is locked only when it is pointing in the usual direction of travel of the baby carriage.

In the normal situation the use and operation described above apply. That is, when the baby carriage is moved on a relatively narrow curved road, the unlocked state as shown in FIG. 4 is maintained. In this case, depending upon the direction of travel of the baby carriage, the wheels 11 change the direction, ensuring satisfactory steerability. On the other hand, when the baby carriage is moved on a road having an extremely uneven road surface such as a gravel road, the locked state shown in FIG. 1 or 5 is established, whereby the direction of the wheels 11 is fixed and the baby carriage can be satisfactorily moved without causing the wheels 11 to fluctuate. And, in either of the aforesaid cases, cushioning actions are exerted on the wheels 11 to minimize the shock to the baby in the baby carriage.

Suppose a situation, unlike such normal travel situation, in which there is a large difference in level forwardly of the direction of travel of the wheel 11, in which case a severe shock is applied to the wheel 11. In this case, if the wheel 11 is in the unlocked state, such shock can be absorbed to some extent by the wheel 11 changing its direction. Further, even in the locked state, when a shock is applied in the direction of arrow 30 or 31 shown in FIG. 1 or FIG. 5, there will be not much load put on the rotary bracket 4 or vertical shaft 5. This is because, if the lock has been canceled, the shock in the direction of arrow 30 or 31 would cause the wheel 11 to point in the illustrated direction; thus, this direction of the wheel 11 may be said to be a natural direction with respect to the shock in the direction of arrow 30 or 31. However, if the locked state is present and if a shock is applied in the opposite direction as indicated by an arrow 32 or 33, there will occur a problem of substantial damage to the caster, particularly to the rotary bracket 4 and vertical shaft 5.

Figure 6:
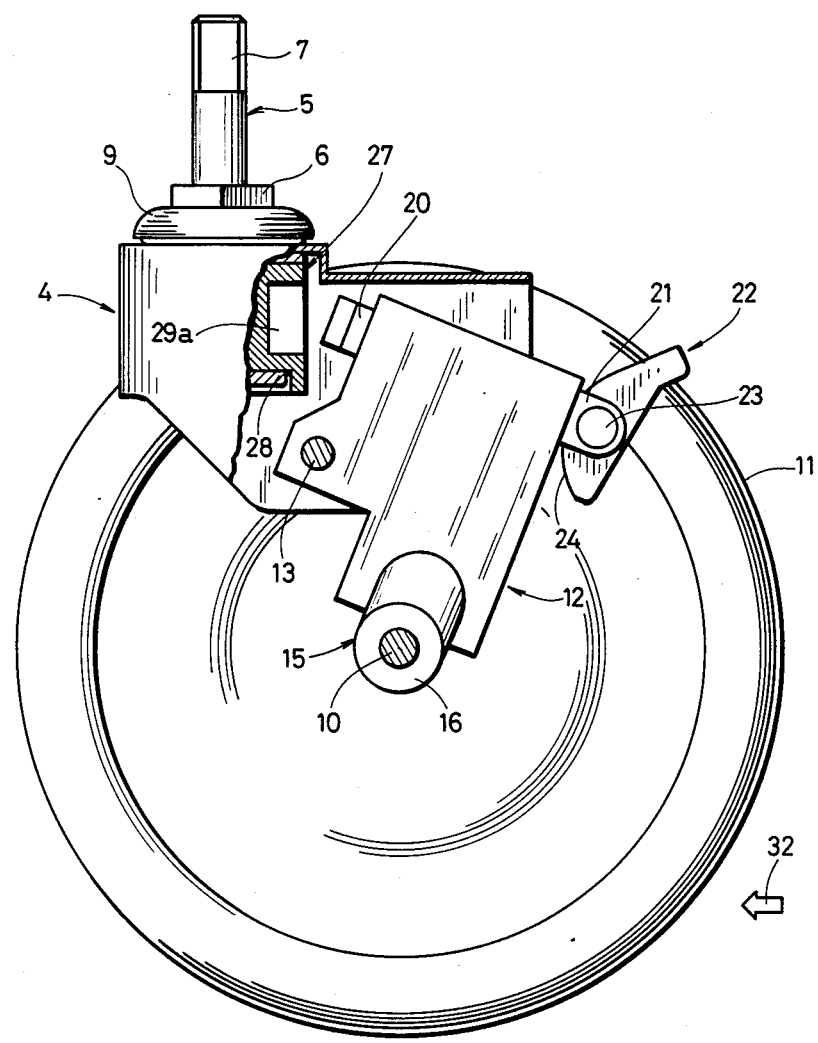
FIG. 6 shows a state which is obtained when in FIG. 1 a shock in the direction of arrow is applied to the wheel.

In this embodiment, it is so arranged that when a shock in the direction of arrow 32 or 33 is encountered, the lock is automatically canceled to allow the wheel 11 to change its direction so as to absorb the shock. FIG. 6 shows a state obtained when a shock in the direction of arrow 32 is applied in the FIG. 1 state.

Referring to FIG. 6, since the wheel attaching bracket 12 is turnably attached to the rotary bracket 4 through the pivot shaft 13, if a shock in the direction of arrow 32 is applied this causes the wheel attaching member 12 to turn in a clockwise direction as viewed in FIG. 6. That is, it is turned in the direction which causes the downward movement of the wheel 11. This turning proceeds against the gravity force applied to the wheel attaching member 12 through the fixed bracket 3 and rotary bracket 4. Thus, it follows that the aforesaid turning takes place when the wheel 11 is subjected to a sufficient force in the direction of arrow 32 to overcome said gravity force. In response to such turning movement, the key member 20 escapes from the fitting recess 29a, allowing the rotary bracket 4 to turn around the axis of the vertical shaft 5 and the wheel 11 to change its direction. Thus, the shock in the direction of arrow 32 can be advantageously absorbed by the wheel 11 changing its direction.

The operation described above is also performed in the locked state shown in FIG. 5 when a shock is applied in the direction of arrow 33.

Figure 7:
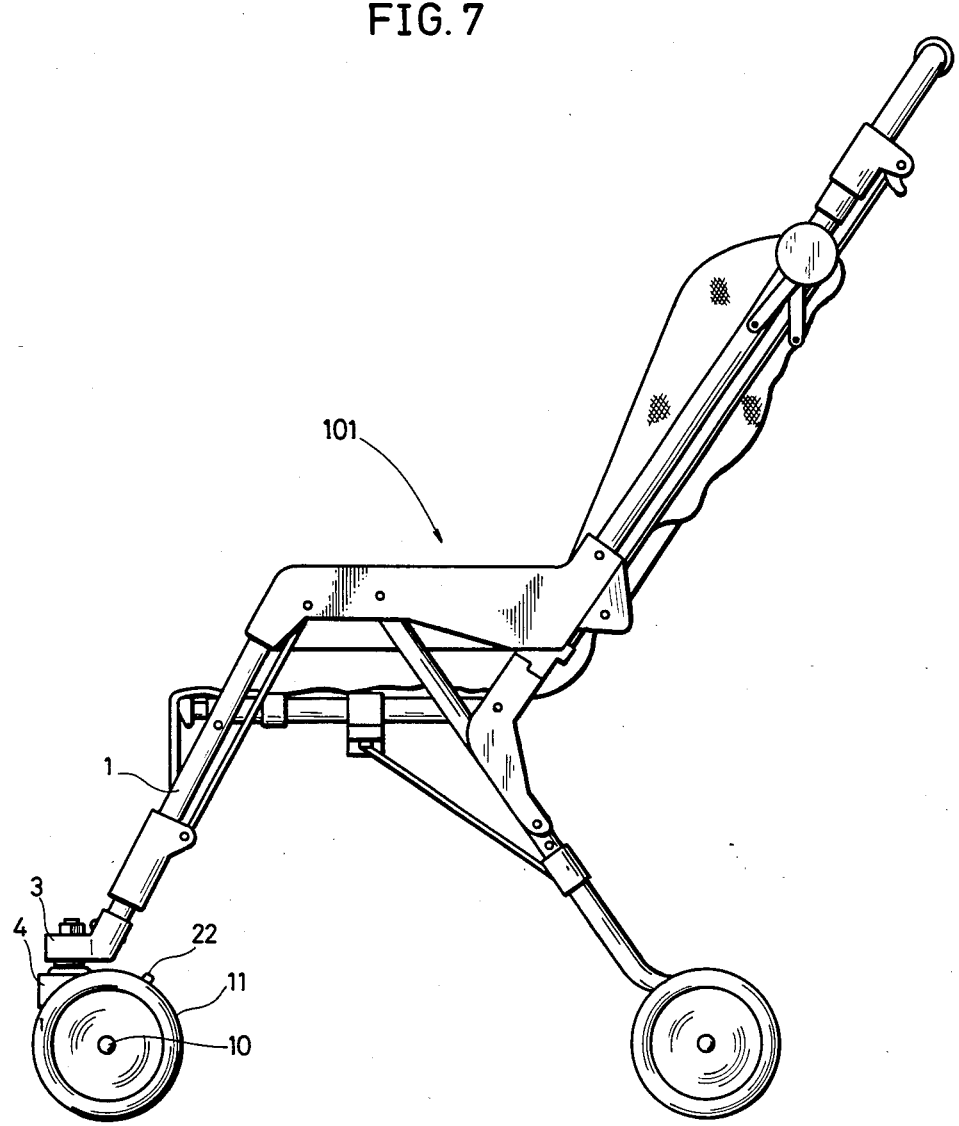
FIG. 7 is a side view of a baby carriage provided with the caster described with reference to FIGS. 1 to 6.

Referring to FIG. 7, there is shown an example of a baby carriage 101 to which the embodiment shown in FIGS. 1 to 6 is advantageously applied. The main body of this baby carriage is disclosed in U.S. Pat. No. 4,317,581 and British Patent No. 2,061,195 which correspond to each other. The baby carriage 101 has front legs 1 described above, and the secured bracket 3 is fixed to the lower end of front leg 1.

While this invention has been described so far with reference to the illustrated embodiment, the embodiment may be suitably changed within the scope of the invention.

For example, only one of the fitting recesses 29a and 29b may be provided in the fixed bush 27.

Further, the arrangement for cushioning the wheel 11 is not essential.

While the baby carriage has been shown by way of example as an object to which the caster is to be attached, the caster according to this invention may be applied to other articles which require casters or which become convenient if casters are attached thereto.

Although the present invention has been described and illustrated in detail, it is clearly understood that the same is by way of illustration and example only and is not to be taken by way of limitation, the scope of the present invention being limited only by the terms of the appended claims.

What is claimed is:

1. A caster having a fixed bracket (3) secured to an object (101) to be moved by said caster, a rotary bracket (4) supported for rotation around a fixedly installed vertical shaft (5) vertically extending from said fixed bracket (3), and a wheel (11) rotatably supported with respect to said rotary bracket (4) on an axle (10) horizontally spaced from the axis of said vertical shaft (5), said caster comprising a wheel attaching member (12) which supports the axle (10) of said wheel (11) is turnably attached to said rotary bracket (4) by a horizontally directed pivot shaft (13) positioned between said vertical shaft (5) and said axle (10); said rotary bracket (14) comprising a stopper (19) which when said wheel attaching member (12) is turned around the axis of said pivot shaft (13), defines the terminal end of the upward movement of said wheel (11); a key member (20) movable toward said vertical shaft (5) installed in said wheel attaching member (12) at a position above said pivot shaft (13); the outer surface of said vertical shaft (5) including at least one fitting recess (29a, 29b) into which said key member fits as it is moved with at least one predetermined angle obtained by the rotation of said rotary bracket (4) around said vertical shaft (5); wherein the arrangement is such that when said key member (20) fits in said fitting recess (29a, 29b), the rotation of said rotary bracket (4) around said vertical shaft (5) is inhibited and, wherein in this inhibited state when a force greater than a predetermined value is applied to said wheel attaching member (12) in a direction to move said wheel (11) downwardly, said wheel attaching member (12) is turned in this direction, with the key member (20) escaping from said fitting recess (29a, 29b), thereby allowing the rotation of said rotary bracket (4) around said vertical shaft (5).

2. The caster as set forth in claim 1, wherein said wheel attaching member (12) is provided with an axle support (15) which is vertically movable and which is urged by a cushion spring (14) in a direction to move downwardly, said axle (10) being supported by said axle support (15), whereby a cushioning action is exerted on said wheel (11).

3. The caster as set forth in claim 1, wherein: said key member (20) is urged by a spring (25) in a direction to move toward said fitting recess (29a, 29b), said key member having a connecting portion (21) projecting beyond the outer surface of said wheel attaching member (12); an operating lever (22) is turnably connected to said connecting portion (21) by a pin (13) extending in parallel to said pivot shaft (13), said operating lever (22) having a cam portion (24) defined by large and small diameter sections having radial dimensions relative to the center of said pin which are relatively long and short, respectively; and wherein the arrangement is such that when said operating lever (22) is turned, said cam portion (24) moves said key member (20) while contacting the outer surface of said wheel attaching member (12) in such a manner that when said large diameter section is on the outer surface of said wheel attaching member (12), said key member (20) is kept from fitting in said fitting recess (29a, 29b), whereby the rotation of said rotary bracket (4) around said vertical shaft (4) is allowed, while when said small diameter section is on the outer surface of said wheel attaching member (12), said key member (20) fits in said fitting recess (29a, 29b) which points to the front end of the key, whereby the rotation of said rotary bracket (4) around said vertical shaft (4) is inhibited.

4. The caster as set forth in claim 1, wherein two of said fitting recess (29a, 29b) are provided which are spaced 180 degrees apart around said vertical shaft (5).

5. The caster as set forth in claim 1, wherein when said key member (20) fits in said fitting recess (29a, 29b), said axle (11) points in the usual direction of travel of said object (101).

6. The caster as set forth in claim 5, wherein said object is a baby carriage (101).

* * * * *